3,047,520
PROTECTIVE URETHANE COATING COMPOSITION
Robert J. Fiel, Tonawanda, N.Y., assignor to Allied Chemical Corporation, New York, N.Y., a corporation of New York
No Drawing. Filed Oct. 28, 1958, Ser. No. 770,008
7 Claims. (Cl. 260—18)

The present invention relates to a coating formulation and more particularly refers to a new and improved urethane coating composition.

Heretofore protective coatings prepared from urethane adducts of castor oil and organic diisocyanates have been used for coating various surfaces, notably wood, glass, concrete, metals, ceramics, leather, textiles and fiber glass polyester laminates. While such coatings have a fair degree of chemical resistance, abrasion resistance, flexibility and impact resistance, industry has sought a coating which not only is superior with respect to these properties but in addition has superior properties of hardness, drying rate, tensile strength, and resistance to discoloration by weathering (exposure to ultraviolet light). Attempts have been made to modify the prior art coating compositions to improve their properties but generally this resulted in impairment of flexibility, impact resistance, chemical resistance and abrasion resistance.

An object of the present invention is to provide an improved urethane coating composition which yields a coating surpassing the prior art coatings in hardness, drying rate, tensile strength, resistance to aromatic solvents and resistance to discoloration by weathering without undue impairment of flexibility, impact resistance, chemical resistance and abrasion resistance.

The superior protective coating composition of the present invention is an anhydrous mixture constituting 80% to 20% by weight, preferably 60% to 40% of an organic solvent having a boiling point within the range of 30° to 175° C. free of active hydrogen as determined by the Zerewitnoff method, preferably a mixed solvent having one constituent boiling below 100° C. and another constituent boiling above 100° C., and 20% to 80% by weight, preferably 40% to 60%, of a film-forming urethane solute prepared by reaction of a hydrocarbon triol having a molecular weight below 200, castor oil, and an organic diisocyanate in the proportion in which the hydrocarbon triol OH/castor oil OH ratio is between 0.05 and 2.50 and the isocyanate NCO/total OH ratio is between 1.5 and 3.5.

To prepare the film-forming urethane solute, castor oil and a hydrocarbon triol having a molecular weight below 200 are mixed in such proportion that the ratio of hydroxyl groups originating from the castor oil to the hydroxyl groups originating from the triol (hereinafter referred to as castor oil OH/triol OH ratio) is between 0.05 and 2.50. The castor oil-triol mixture is then reacted with an organic diisocyanate in such proportions that the ratio of the isocyanate groups to hydroxyl groups in the reactants (hereinafter referred to as NCO/total OH mol ratio) is between 1.5:1 and 3.5:1. Prior to application, the coating composition is charged with a small amount of catalyst, a nitrogenous organic base, to accelerate the film-forming reaction.

Solvents used in the coating composition of the present invention should have a chemical nature such that it is substantially free of active hydrogen as determined by the Zerewitnoff method (cf. Kohler et al., 40, J. Am. Chem. Soc., 3181-8 (1927)). Such reactive hydrogen (e.g. the hydrogen present in hydroxyl groups, carboxyl groups, primary or secondary amino groups, etc.) would react with the free isocyanate groups present in the film-forming solute. Further, the solvent should be characterized by a boiling point within the range of 30° C. to 175° C. Formulations of the present invention exhibiting unusually good properties should contain a mixed solvent in which one solvent constituent has a boiling point above 30° C. but below 100° C. and the other constituent has a boiling point below 175° C. but above 100° C. Suitable solvents include toluene, xylene, various petroleum hydrocarbon distillate fractions, toluene-methylene chloride mixtures, isopropyl ether, ethyl acetate, methyl ethyl ketone and cyclohexanone. The amount of solvent should be between 20% and 80% by weght of the total formulation. Below this range, the formulation is too viscous to be used effectively; above it, the formulation is too dilute to lay down a coating of adequate thickness and covering power.

Better commercial grades of castor oil are preferred. Suitable hydrocarbon triols include glycerine, hexanetriol-1,2,6,trimethylol propane and trimethylol ethane. As stated above, the triol OH/castor oil OH ratio should be between 0.05 and 2.50. Below these limits, significant improvement is not uniformly obtained; above these limits, the formulations obtained are unstable and develop turbidity on standing.

Organic diisocyanates suited for making the formulation include, among many others, 2,4- and 2,6-tolylene diisocyanates, diphenyl methane-4,4'-diisocyanate, 1-chlor phenylene-2,4-diisocyanate, para and meta phenylene diisocyanate, hexamethylene diisocyanate, 3,3'-bitolylene-4,4'-diisocyanate and 1,5-naphthalene diisocyanate. As stated above, the amounts of reactants used should be such that the NCO/OH mol ratio thereof is between 1.5:1 and 3.5:1.

Preferably, the coating composition is prepared by dissolving the castor oil and triol in the organic solvent and adding the solution to a reaction vessel containing the organic diisocyanate. The batch is agitated under a dry atmosphere, e.g. dry nitrogen gas, at 40 to 90° C. for 30 to 120 minutes. An exothermic reaction takes place between hydroxyl groups and isocyanate groups forming urethane linkages. The reactor should be equipped to provide both heating and cooling in order to maintain the desired temperature. The reaction product is discharged into clean dry containers wherein it may be kept indefinitely.

Catalysts capable of accelerating the film-forming reaction are, in general, bases. Nitrogen-containing organic bases such as tertiary amines are preferred to inorganic bases because the latter are too active. Examples of suitable catalysts include methyl diethanolamine, dimethyl ethanolamine, N-methyl morpholine, diethyl cyclohexyl amine, 3-methyl isoquinoline, adipic acid diester of diethylaminoethanol, etc.

Preferably the catalyst is stirred into the formulation immediately prior to use. The amount of catalyst used will vary according to the reactivity of the formulation, the activity of the catalyst and the rate of cure desired, and the minimum "pot life" desired for the catalyzed formulation. The amount of catalyst used will generally vary between 1% and 5% by weight of the formulation exclusive of solvent.

The catalyzed composition may be applied by any conventional means, e.g. dipping, brushing or spraying. If desired, heat may be applied to the coated surface to accelerate the rate of cure.

Care should be taken to avoid or minimize the presence of water in reactants, reaction equipment, containers, catalyst, and application equipment. Water reacts readily with isocyanate, whether in the form of a reactant or of a component of the reaction medium or reaction product, to form urea linkages between isocyanate groups with simultaneous evolution of carbon dioxide. This forms gas bubbles in the composition and degrades its quality in other respects.

The chemistry of the film-forming reactions is not fully understood, but it is believed that the following types of reactions link two or more of the high molecular weight urethane adduct molecules prepared from the castor oil and triol: reactions between two terminal isocyanate groups to form uretidinedione linkages; reaction between three isocyanate groups to form cyclic triisocyanurate linkages; and reactions between terminal isocyanate groups and urethane bridges (in the adduct molecules) to form allophanic ester linkages. Urea linkages may also be formed by reaction between two terminal isocyanate groups and one molecule of water, carbon dioxide gas being evolved simultaneously. This reaction (which is the principal reaction involved in the formation of polyurethane foams) is, as previously stated, undesirable if it occurs in bulk coating composition.

The following examples describe the composition, preparation, application and properties of protective coatings representative of the present invention.

EXAMPLE 1.—PREPARATION AND PROPERTIES OF COATINGS MADE FROM CASTOR OIL, HEXANETRIOL AND A MIXTURE OF m-TOLYLENE DIISOCYANATES

Part A.—Preparation of "Control" Composition From Castor Oil and m-Tolylene Diisocyanate The castor oil used in this example ("DB oil," marketed by Baker Castor Oil Co.) had a hydroxyl number of 163, an acid number of about 1, an equivalent weight (hydroxyl group basis) of 344 and a composition equivalent to about 90% glycerine triricinoleate.

The m-tolylene diisocyanate used in this example was a liquid mixture containing about 20% of the 2,6-isomer and 80% of the 2,4-isomer.

1436 parts of the m-tolylene diisocyanate mixture were charged to a closed, agitator-equipped vessel and covered with an atmosphere of dry nitrogen gas. A solution of castor oil (2630 parts) in 4066 parts of a mixed solvent containing equal weights of toluene and ethyl acetate was then added with agitation. The batch temperature was allowed to rise (from heat evolved during the exothermic reaction) to 60° C. and held thereat for one hour. The batch was then cooled to room temperature.

Data on the composition of the product and the properties of coatings prepared therefrom are set forth in the "Sample 1" columns of Tables 1 and 2.

Part B.—Preparation of Improved Coating Compositions From Castor Oil, Hexanetriol-1,2,6 and m-Tolylene Diisocyanate Five coating compositions were prepared as described in Part A above, except that part of the castor oil charge was replaced by a chemically equivalent amount (hydroxyl group basis) of hexanetriol-1,2,6. Data on the composition of these products and on the properties of applied coatings made therefrom are set forth in Table 1 (samples 2 to 6 inclusive).

Part C.—Properties of Applied Coatings Prepared From Compositions Described in Parts A and B Table 1 sets forth data on the physical and chemical properties of applied coatings and self-sustaining films prepared from the compositions described in Parts A and B supra. Prior to application, the compositions were charged with 4% by weight of methyl diethanolamine catalyst based on the non-volatiles content.

Drying time tests were made on 3-mil thick wet coatings applied to glass by a Bird film applicator (drawdown blade). The "dry hard" time is the minimum time required for a coating to dry sufficiently so that it is unaffected by the action of a thumb applied to the film with pressure and turned.

The Sward hardness tests were made by the rocking device and procedure described on pages 164–6 of "Physical and Chemical Examination: Paints, Varnishes, Lacquers, Color," by H. A. Gardner and G. G. Sward, Bethesda, Maryland, 11th ed. (1950). The data are based on a hardness scale wherein the hardness of a polished plate glass surface has an assigned value of 100.

The flexibility test was carried out by bending a metal panel, coated with a dry film from the sample composition, around a conical mandrel 8" long, 1½" in diameter at the base, and ⅛" in diameter at the apex. Apparatus and test procedure are described on page 172 of the Gardner and Sward reference cited above. For a coating to pass this test, the film must not crack or rupture as a result of the bending.

The impact resistance tests were carried out by subjecting the coated surface of a test panel to the impact of a falling weight. A Gardner impact tester, described on page 188A of the Gardner-Sward reference cited above and designed to provide a maximum impact of 28 inch-lbs., was used. The films tested did not crack or rupture under the maximum impact obtained from this unit.

The tensile strength tests were carried out on self-sustaining films prepared by casting the coating composition on a mercury surface, allowing it to dry at room temperature for 28 hours and then curing it at 100° C. for one hour. Strips of film were subjected to an increasing weight load in a Dillon pendulum type tester according to a procedure described in American Society of Testing Materials, Tentative Method D882–54T.

The solvent resistance tests were carried out on strips of film prepared by casting on mercury as described above. The films were immersed in toluene for 48 hours. Areas of the film strips were measured before and after immersion to determine the dimensional stability of the film, i.e. its resistance to the swelling effect of the solvent. The films were also weighed before and after immersion to determine the change in weight caused by the solvent.

The color retention test ranks the film in the order of their resistance to discoloration under prolonged exposure (500 hours) to the action of intense ultraviolet radiation and water spray in a "Weatherometer." The films tested were spray-coated on steel panels.

TABLE 1.—COMPOSITION OF CASTOR OIL-HEXANETRIOL-m-TOLYLENE DIISOCYANATE COATING COMPOSITIONS AND PROPERTIES OF COATINGS PREPARED THEREFROM

| Sample | 1 | 2 | 3 | 4 | 5 | 6 |
|---|---|---|---|---|---|---|
| Components, parts by weight: | | | | | | |
| m-Tolylene diisocyanate | 1,436 | 1,436 | 1,436 | 1,436 | 1,436 | 1,436 |
| Castor Oil | 2,630 | 2,498 | 2,367 | 2,104 | 1,841 | 1,315 |
| Hexanetriol-1, 2, 6 | | 16.7 | 33.5 | 67.0 | 100 | 167 |
| Ethyl Acetate | 2,033 | 1,975 | 1,918 | 1,803 | 1,738 | 1,459 |
| Toluene | 2,033 | 1,975 | 1,918 | 1,803 | 1,738 | 1,459 |
| Wt. Percent Solvent | 50 | 50 | 50 | 50 | 50 | 50 |
| Triol OH/Castor Oil OH ratio | 0 | 0.05 | 0.11 | 0.24 | 0.48 | 0.93 |
| NCO/OH mol ratio | 2.16 | 2.16 | 2.19 | 2.17 | 2.18 | 2.19 |
| Properties of Coatings: | | | | | | |
| Dry hard time, hrs | 2½ | 2¼ | 2 | 2 | 1½ | 1¼ |
| Sward hardness at 28 hrs | 28 | 30 | 33 | 40 | 50 | 60 |
| Sward hardness at 1 week | 28 | 30 | 33 | 41 | 50 | 62 |
| Flexibility Test | Pass | Pass | Pass | Pass | Pass | Pass |
| Impactness Resistance in. lbs | >28 | >28 | >28 | >28 | >28 | >28 |
| Tensile strength, p.s.i. | 3,020 | 3,510 | 4,065 | 4,862 | 3,620 | 5,787 |
| Color retention, relative | 6 | 5 | 4 | 3 | 2 | 1 |
| Toluene Resistance— | | | | | | |
| Area increase, percent | 63 | 59.6 | 55.1 | 40.4 | 42.5 | 2.1 |
| Weight loss, percent | 1.04 | 1.03 | 0.77 | 0 | 0 | 0 |

EXAMPLE 2.—PREPARATION AND PROPERTIES OF COATINGS MADE FROM CASTOR OIL, GLYCERINE AND A MIXTURE OF m-TOLYLENE DIISOCYANATES

Five coating compositions were prepared as described in Example 1 above, except that glycerine was used instead of hexanetriol-1,2,6. Data on the composition of these products and the properties of applied coatings made therefrom are set forth in Table 2, Samples 2 to 6 inclusive. Comparative data for the control composition, prepared as described in Example 1, Part A above, are given in the Sample 1 column of Table 2.

TABLE 2.—COMPOSITION OF CASTOR OIL-GLYCERINE-m-TOLYLENE DIISOCYANATE COATING COMPOSITIONS AND PROPERTIES OF COATINGS PREPARED THEREFROM

| Sample | 1 | 2 | 3 | 4 | 5 | 6 |
|---|---|---|---|---|---|---|
| Components, parts by weight: | | | | | | |
| m-Tolylene diisocyanate | 1,436 | 1,436 | 1,436 | 1,436 | 1,436 | 1,436 |
| Castor oil | 2,630 | 2,367 | 2,104 | 1,841 | 1,315 | 789 |
| Glycerine | | 26 | 46 | 69 | 115 | 161 |
| Ethyl acetate | 2,033 | 1,914 | 1,793 | 1,673 | 1,433 | 1,193 |
| Toluene | 2,033 | 1,914 | 1,793 | 1,673 | 1,433 | 1,193 |
| Wt. Percent Solvent | 50 | 50 | 50 | 50 | 50 | 50 |
| Triol OH/Castor Oil OH ratio | 0 | 0.13 | 0.24 | 0.42 | 1.03 | 2.20 |
| Total NCO/OH mol ratio | 2.16 | 2.16 | 2.16 | 2.18 | 2.19 | 2.16 |
| Properties of Coatings: | | | | | | |
| Dry hard time, hrs | 2½ | ¾ | ¾ | ½ | | ¼ |
| Sward Hardness at 48 hrs | 28 | 37 | 43 | 49 | | 72 |
| Sward Hardness at 1 week | 28 | 39 | 43 | 48 | 51 | 75 |
| Flexibility Test | Pass | Pass | Pass | Pass | Pass | Pass |
| Impact resistance, in. lbs | >28 | >28 | >28 | >28 | >28 | >28 |
| Tensile strength, p.s.i. | 3,020 | 3,680 | 3,825 | 3,660 | 5,535 | 6,900 |
| Color, retention, relative | 6 | 5 | 4 | 3 | 2 | 1 |

EXAMPLE 3

The diphenylmethane-4,4'-diisocyanate used in this example was 99.4% pure and had a solidification point of 37.2° C.

A "control" coating was prepared from castor oil and diphenylmethane-4,4'-diisocyanate as follows. The diisocyanate (1875 parts) was melted and heated to 45° C. under an atmosphere of dry nitrogen gas in a closed vessel provided with an agitator and external heating and cooling means. Castor oil (2630 parts) was added slowly. After the temperature rose to 60° C. from exothermic heat of reaction, it was held thereat for one hour. The batch was then cooled to room temperature and filtered. Data on this coating composition are given in the "Sample 1" column of Table 3.

The "Sample 2" and "Sample 3" columns of Table 3 give comparative data on coatings prepared in like manner except that part of the castor oil was replaced by an equivalent amount (hydroxyl group basis) of glycerine.

TABLE 3.—COMPOSITION OF CASTOR OIL-GLYCERINE-DIPHENYLMETHANE-4, 4'-DIISOCYANATE COATING COMPOSITIONS AND PROPERTIES OF COATINGS MADE THEREFROM

| Sample | 1 | 2 | 3 |
|---|---|---|---|
| Components, Parts by weight: | | | |
| Diphenylmethane-4,4'-diisocyanate | 1,875 | 1,875 | 1,875 |
| Castor Oil | 2,630 | 2,367 | 2,104 |
| Glycerine | | 26 | 46 |
| Ethyl Acetate | 2,252 | 2,133 | 2,013 |
| Toluene | 2,252 | 2,133 | 2,013 |
| Wt. percent Solvent | 50 | 50 | 50 |
| Triol OH/Castor oil ratio | 0 | 0.13 | 0.24 |
| Total NCO/OH mol ratio | 1.96 | 1.96 | 1.96 |
| Properties of Coatings: | | | |
| Sward hardness at 48 hrs | 18 | 24 | 42 |
| Sward hardness at 1 week | 32 | 39 | 58 |

The data presented in the foregoing examples show that all samples tested had such outstanding flexibility and impact resistance that they exceeded the limits of the test equipment. (For example, the impact resistance of a conventional alkyd phenolic spar varnish was only 4 inch-lbs. compared to the values in excess of 28 inch-lbs. for the coating compositions reported in the examples.) Surprisingly, the great improvements in hardness effected by substitution of part of the castor oil by glycerine or hexanetriol did not cause sufficient embrittlement to reduce the flexibility and impact resistance values of the composition below the limits of the test equipment. The data further show that substitution of part of the castor oil by glycerine or hexanetriol-1,2,6 effected a substantial improvement in the following other properties of the applied coatings: resistance to weathering and discoloration by ultraviolet light, resistance to aromatic solvents (toluene), tensile strength, and drying rate.

Although certain preferred embodiments of the invention have been disclosed for purpose of illustration, it will be evident that various changes and modifications may be made therein without departing from the scope and spirit of the invention.

I claim:

1. A protective coating composition comprising an anhydrous mixture constituting 80% to 20% by weight of an organic solvent having a boiling point within the range of 30° C. to 175° C. free of active hydrogen as determined by the Zerewitnoff method, and 20% to 80% by weight of a film-forming urethane solute prepared by reaction of an aliphatic hydrocarbon triol selected from the group consisting of glycerine, hexanetriol-1,2,6, trimethylol propane and trimethylol ethane, castor oil, and an organic diisocyanate in the proportion in which the hydrocarbon triol OH/castor oil OH ratio is between 0.05 and 2.50 and the isocyanate NCO/total OH ratio is between 1.5 and 3.5.

2. A protective coating composition comprising an anhydrous mixture constituting 60% to 40% by weight of an organic solvent having a boiling point within the range of 30° C. to 175° C. free of active hydrogen as determined by the Zerewitnoff method, and 40% to 60% by weight of a film-forming urethane solute prepared by reaction of an aliphatic hydrocarbon triol selected from the group consisting of glycerine, hexanetriol-1,2,6, trimethylol propane and trimethylol ethane, castor oil, and an organic diisocyanate in the proportion in which the hydrocarbon triol OH/castor oil OH ratio is between 0.05 and 2.50 and the isocyanate NCO/total OH ratio is between 1.5 and 3.5.

3. A protective coating composition comprising an anhydrous mixture constituting 80% to 20% by weight of a mixed organic solvent medium having one solvent constituent boiling above 30° C. but below 100° C. and another solvent constituent boiling below 175° C. but above 100° C. free of active hydrogen as determined by the Zerewitnoff method, and 20% to 80% by weight of a film-forming urethane solute prepared by reaction of an aliphatic hydrocarbon triol selected from the group consisting of glycerine, hexanetriol-1,2,6, trimethylol propane and trimethylol ethane, castor oil, and an organic diisocyanate in the proportion in which the hydrocarbon triol OH/castor oil OH ratio is between 0.05 and 2.50 and the isocyanate NCO/total OH ratio is between 1.5 and 3.5.

4. A protective coating composition comprising an anhydrous mixture constituting 60% to 40% by weight of an organic solvent medium comprising ethyl acetate and toluene, and 40% to 60% by weight of a film-forming urethane solute prepared by reaction of an aliphatic hydrocarbon triol selected from the group consisting of glycerine, hexanetriol-1,2,6, trimethylol propane and trimethylol ethane, castor oil, and an organic diisocyanate in the proportion in which the hydrocarbon triol OH/castor oil OH ratio is between 0.05 and 2.50 and the isocyanate NCO/total OH ratio is between 1.5 and 3.5.

5. A protective coating composition comprising an anhydrous mixture constituting 60% to 40% by weight of an organic solvent medium comprising ethyl acetate and toluene, and 40% to 60% by weight of a film-forming urethane solute prepared by reaction of hexanetriol-1,2,6, castor oil, and tolylene diisocyanate in the proportion in which the hexanetriol-1,2,6 OH/castor oil OH ratio is between 0.05 and 2.50 and the tolylene diisocyanate NCO/total OH ratio is between 1.5 and 3.5.

6. A protective coating composition comprising an anhydrous mixture constituting 60% to 40% by weight of an organic solvent medium comprising ethyl acetate and toluene, and 40% to 60% by weight of a film-forming urethane solute prepared by reaction of glycerine, castor oil, and tolylene diisocyanate in the proportion in which the glycerine OH/castor oil OH ratio is between 0.05 and 2.50 and the tolylene diisocyanate NCO/total OH ratio is between 1.5 and 3.5.

7. A protective coating composition comprising an anhydrous mixture constituting 60% to 40% by weight of an organic solvent medium comprising ethyl acetate and toluene, and 40% to 60% by weight of a film-forming urethane solute prepared by reaction of hexanetriol-1,2,6, castor oil, and diphenylmethane-4,4'-diisocyanate in the proportion in which the hexanetriol-1,2,6 OH/castor oil OH ratio is between 0.05 and 2.50 and the diphenylmethane-4,4'-diisocyanate NCO/total OH ratio is between 1.5 and 3.5.

References Cited in the file of this patent

UNITED STATES PATENTS

| | | |
|---|---|---|
| 2,833,730 | Barthel | May 6, 1958 |
| 2,864,780 | Katz et al. | Dec. 16, 1958 |
| 2,966,472 | Fiel | Dec. 27, 1960 |

OTHER REFERENCES

Chemical Engineering, 57 (No. 4), 165–6 (1950).

Heiss et al.: Ind. Eng. Chem., 46 (No. 7), 1498–1503 (1954).

Bailey: S.P.E. Journal, 14 (No. 2) 41–3 (February 1958).